United States Patent
Raines et al.

(10) Patent No.: US 6,904,336 B2
(45) Date of Patent: Jun. 7, 2005

(54) SYSTEM AND METHOD FOR RESIDENTIAL EMISSIONS TRADING

(75) Inventors: Franklin D. Raines, Washington, DC (US); Robert J. Sahadi, Clarksburg, MD (US); Kenneth Berlin, Bethesda, MD (US); Michelle Desiderio, Washington, DC (US); Scott Lesmes, Washington, DC (US); Elizabeth Arner Cavey, Arlington, VA (US); Carlton Bartels, deceased, late of Staten Island, NY (US); by Jane Bartels, legal representative, Staten Island, NY (US)

(73) Assignees: Fannie Mae, Washington, DC (US); CO2e.com, LLC, New York, NY (US)

( * ) Notice: Subject to any disclaimer, the term of this patent is extended or adjusted under 35 U.S.C. 154(b) by 166 days.

(21) Appl. No.: 10/290,753

(22) Filed: Nov. 8, 2002

(65) Prior Publication Data

US 2004/0015454 A1 Jan. 22, 2004

Related U.S. Application Data (60) Provisional application No. 60/342,853, filed on Dec. 28, 2001.

(51) Int. Cl.[7] ............................................... G05D 11/00
(52) U.S. Cl. .................... 700/286; 700/295; 705/401
(58) Field of Search ................................. 700/291, 286, 700/297, 292, 226, 224–227; 705/412, 7, 37, 1; 702/64

(56) References Cited

U.S. PATENT DOCUMENTS

| | | | |
|---|---|---|---|
| 4,677,552 A | 6/1987 | Sibley, Jr. | |
| 4,731,575 A | 3/1988 | Sloan | |
| 4,750,119 A | 6/1988 | Cohen et al. | |
| 5,237,507 A | 8/1993 | Chasek | |
| 5,297,026 A | 3/1994 | Hoffman | |
| 5,519,622 A | 5/1996 | Chasek | |
| 5,532,928 A | 7/1996 | Stanczyk et al. | |
| 5,621,654 A | 4/1997 | Cohen et al. | |
| 5,664,112 A | 9/1997 | Sturgeon et al. | |
| 5,696,695 A | 12/1997 | Ehlers et al. | |
| 5,726,884 A | 3/1998 | Sturgeon et al. | |
| 5,794,212 A | 8/1998 | Mistr, Jr. | |
| 5,894,422 A | 4/1999 | Chasek | |
| 5,915,244 A | 6/1999 | Jack et al. | |
| 5,924,486 A | 7/1999 | Ehlers et al. | |
| 5,930,773 A | 7/1999 | Crooks et al. | |
| 5,962,989 A | 10/1999 | Baker | |
| 6,047,274 A | 4/2000 | Johnson et al. | |

(Continued)

OTHER PUBLICATIONS

Chinn, Lily N., "Can the Market Be Fair and Efficient? An Environmental Justice Critique of Emissions Trading", 26 Ecology L.Q. 80 (1999).

(Continued)

*Primary Examiner*—Kidest Bahta
(74) *Attorney, Agent, or Firm*—Collier Shannon Scott PLLC

(57) ABSTRACT

The present invention is directed to a method of residential emissions trading and a residential emissions trading commodity. In particular, an embodiment of the present invention is a method for identifying, quantifying, and aggregating reductions in residential emissions into a tradable commodity. The step of quantifying the emissions reduction may further comprise the steps of measuring an energy savings resulting from the energy savings opportunity and calculating the emissions reduction resulting from the energy savings. The method may further comprise the steps of verifying the quantification of the emissions reduction and monitoring the residential energy savings opportunities and the quantification of the emissions reduction.

17 Claims, 7 Drawing Sheets

U.S. PATENT DOCUMENTS

| | | | |
|---|---|---|---|
| 6,067,549 | A | 5/2000 | Smalley et al. |
| 6,115,698 | A | 9/2000 | Tuck et al. |
| 6,169,979 | B1 | 1/2001 | Johnson et al. |
| 6,256,640 | B1 | 7/2001 | Smalley et al. |
| 6,678,620 | B1 * | 1/2004 | Tamai et al. .................. 702/61 |
| 2001/0032168 | A1 | 10/2001 | Adarnson et al. |
| 2001/0049651 | A1 | 12/2001 | Selleck |
| 2002/0035496 | A1 * | 3/2002 | Fukushima et al. ............ 705/7 |
| 2002/0040356 | A1 * | 4/2002 | Gluck et al. ................ 705/412 |
| 2002/0143693 | A1 * | 10/2002 | Soestbergen et al. ......... 705/37 |
| 2002/0178047 | A1 * | 11/2002 | Or et al. ....................... 705/10 |
| 2003/0055665 | A1 | 3/2003 | Fleming |
| 2003/0085179 | A1 | 5/2003 | Kim et al. |
| 2003/0101062 | A1 * | 5/2003 | Taber, Jr. ....................... 705/1 |
| 2003/0110116 | A1 * | 6/2003 | Inubushi ...................... 705/36 |

OTHER PUBLICATIONS

Driesen, David, "Is Emissions Trading An Economic Incentive Program?: Replacing The Command And Control/Economic Incentive Dichotomy", 55 Wash. & Lee L. Rev. 289 (1998).

Gorrell, M., "Taking Pollution To The 'Bank' Pays Dividends Program Offers Utah Firms A Reward For Cleaning Up", The Salt Lake Tribune, May 29, 1995, at D3.

Holly, Chris, "EC Moves On Greenhouse Emissions Trading Plan", The Energy Daily, 28 (53), Mar. 2000.

Jarman, M., "Utilities Set For Pinch In Resources", The Arizona Republic, Dec. 2000, at B1.

Pallasch, Abdon M., "City To Receive Millions From HUD To Reclaim Brownfields; 5 Industrial Locations Expected To Attract New Factories, Jobs", Chi. Trib., Nov. 17, 1998, at 5.

Porter, N., "Legislators Begin Emissions Talks Resolution Sought To Untangle Conflict", Bangor Daily News, Aug. 4, 1994.

Rosenfeld, Arthur, et al., "Policies To Reduce Heat Islands: Magnitudes Of Benefits And Incentives To Achieve Them", Proceedings of the ACEEE Summer Study on Energy Efficiency in Buildings, vol. 9 (1996) at 177.

"Cold Facts On Hot Topic", The Calgary Sun, Nov. 18, 2000, at SE3.

"EPSA Says California Discourages Generators", Generation Week, 2 (44), Nov. 1, 2000.

"EPSA: Don't Exclude New Plants From NOx Trading", The Electricity Daily, 9 (108), Dec. 5, 1997.

"Green Power Is Too Gray", Electrical World, 211 (5), May 1997, at 44.

"Climate Change: A Backgrounder; Petroleum Communication Foundation", Oilweek, 45 (46), Nov. 14, 1994, at S1.

"Indiana House Passes Bill Allowing Pre–Approval Of Compliance Costs", Utility Environment Report, Apr. 19, 1991, at 3.

"SCAQMD Proposes Adding Natural Gas Cuts To Its Reclaim Trading Program", Utility Environment Report, May 27, 1994, at 9.

"Waffling On Warming: Canada Has No Clear Policy On Climate Change", Calgary Herald, Mar. 2, 1998, at A16.

California Energy Commission, "1999 Electricity Generation Emissions Report", Jul. 1999.

"Green Light", The National Journal, 25 (24), Jun. 12, 1993, at 1421.

* cited by examiner

SYSTEM AND METHOD FOR RESIDENTIAL EMISSIONS TRADING

CROSS REFERENCE TO RELATED APPLICATIONS

The present invention relates to, and is entitled to the benefit of the earlier filing date and priority of, U.S. Provisional Application Ser. No. 60/342,853, filed Dec. 28, 2001, entitled "System and Method for Residential Emissions Trading," which is hereby incorporated by reference.

FIELD OF THE INVENTION

The present invention relates to a method of residential emissions trading and a residential emissions trading commodity. In particular, the present invention is directed to a method of identifying, quantifying, and aggregating reductions in residential emissions into a form in which they can be traded for consideration. The present invention further comprises a method for measuring, monitoring, and verifying residential energy savings and the resulting emissions reductions. Energy savings are quantified and aggregated to produce a commodity that may be traded in any suitable program, facility, or transaction.

BACKGROUND OF THE INVENTION

Various systems and programs for quantifying and trading emissions credits have evolved in response to environmental legislation and/or regulations in the United States. For example, the "bubble concept" of treating an entire industrial complex as a single source, with a single allowable emission rate, was advanced by the U.S. steel industry in the late 1970s. This approach let companies choose the most cost-effective mix of controls to achieve the overall environmental goal for the facility. In contrast, the prevailing regulatory framework at that time imposed individual emission limits on each source within the complex. The U.S. Environmental Protection Agency (EPA) later adopted such a "bubble policy" for air emissions.

The intra-plant bubble concept thereafter evolved to allow for trading of emissions credits between companies. Pursuant to the Clean Air Act of 1970, EPA, in December 1976, published an interpretive ruling that allowed new source construction in areas that were not in attainment with national ambient air quality standards only if a new source obtained emission reduction "offsets" that exceeded the emission increases from the new construction. EPA's interpretive ruling expressly allowed owners of new sources to obtain these offsets from other companies that operated facilities located in the same air quality control region. EPA adopted regulations codifying the emissions offset requirement subsequent to the Clean Air Act Amendments of 1977. To implement the emissions offset requirement, many states have developed regulations allowing sources to register their emissions reductions as "emission reduction credits" that can be sold to companies required to offset emissions from new of modified sources. Brokerage companies typically handled sales between companies having surplus emission reduction credits and those wanting to acquire such credits.

In 1990, the Clean Air Act Amendments formally legislated emission trading. For the EPA Acid Rain Program, the Chicago Board of Trade has, since 1998, administered an annual auction of sulfur dioxide ($SO_2$) allowances from private allowance holders (utilities or brokers) to regulated companies, brokers, environmental groups, and the general public. Beginning in 1999, the EPA Ozone Transport Commission $NO_x$ Budget Program allowed trading in nitrogen oxides ($NO_x$) credits in a group of U.S. states, to reduce summer smog.

Other domestic emissions credit programs have been proposed or implemented on a state or regional level. The RECLAIM Program (Regional Clean Air Incentives Market) applies to stationary sources in southern California and is administered by the South Coast Air Quality Management District (SCAQMD). Trading of RECLAIM Trading Credits (RTCs) in sulfur oxides ($SO_x$) and $NO_x$ began in 1994 in an effort to reduce the area's severe smog. If emissions are below the permitted limit, the excess RTCs may be sold to others.

California's SCAQMD program provides alternate methods of compliance with local emissions reduction regulations. For example, in 1997, the SCAQMD promulgated Rule 2506, which established a voluntary program that encourages replacement of old, higher-emitting equipment not subject to state permitting or registration requirements (area sources) with lower-polluting technology. The Rule 2506 program generates emissions credits termed Area Source Credits (ASCs).

The PERT Project (Pilot Emission Reduction Trading), in Ontario, Canada began in 1996 and comprises members from industry, government, and public interest organizations. Under PERT, Emission Reduction Credits (ERCs) are created when the pollution source reduces emissions below its actual level or regulated level. ERCs may be used by the source to meet current or future emissions caps, or may be sold. ERCs may be $SO_2$, $NO_x$, $CO_2$, greenhouse gases (GHG) or other contaminants.

Emission trading is also contemplated on an international level. The 1997 Kyoto Protocol, an agreement pursuant to the United Nations Framework Convention on Climate Change, provides for "bubbles" or the pooling of obligations within groups of countries, e.g., the European Union, for GHG. Other proposals under the Kyoto Protocol include international trading of emissions among certain countries, and credit for joint projects implemented in certain countries. A number of countries have ratified the Kyoto Protocol.

The various schemes described above provide substantial incentives for certain sources of pollution, such as utilities and industrial plants, to reduce their emissions. Notably lacking in these schemes, however, are programs for capturing the benefits of potential energy efficiency measures and the resulting emissions reductions by residential consumers.

Theoretically, residential emission reductions could be recognized under a variety of emissions trading programs. However, four hurdles have historically kept reductions from residential housing sources off the market:

1. Residential emission savings are generated in very small quantities relative to those sought by the market;
2. Residential emission savings are not yet fully recognized by prior known regulatory regimes;
3. Residential emission savings are generated by many, many homeowners with no means or incentive for collective action; and
4. Transaction costs—those associated with quantifying, certifying, marketing, selling, and transferring the reductions—have been prohibitive.

Residential housing units account for approximately one-fifth of GHG emissions in the U.S. Building more efficient homes, retrofitting existing ones, and/or making other structural and fuel changes can dramatically decrease the amount of energy used. Energy efficiency improvements are made to residential units in some instances in response to energy company demand-side management programs, consumer upgrades, and/or builder incentives. Yet, the energy savings from a simple individual home has a non-measurable impact at electricity generation plants. The aggregate impact of energy efficiency upgrades to thousands of homes, however, could have a significant impact, such as reductions in peak load.

These decreases in energy consumption naturally lead to a reduction in air pollutant emissions (i.e., criteria pollutants and GHG). Other measures, such as switching to low-VOC paints, paving driveways, and improving home design, can also have significant impacts on air pollution. Although the air quality impact of a single energy efficient home is relatively small, the result can be quite dramatic when the emissions reductions from large numbers of homes are aggregated together. When the individual residential energy savings are aggregated in sufficient volumes, embodiments of the present invention contemplate that the aggregation will represent a significant tradable commodity in existing and future emissions trading markets.

Embodiments of the present invention have many potential benefits and advantages. Energy costs are typically the second largest cost for homeowners. A program that provides incentives to invest in energy efficiency will save the homeowner money. It has been estimated, for example, that an efficient house can save 30% on annual energy bills. In addition, embodiments of the present invention may create a valuable new commodity and decrease the cost of energy efficiency. Embodiments of the present invention may reduce the amount of air pollution associated with housing: an energy efficient house may save 2–3 tons of $CO_2$ per year and 3–5 lbs. of $NO_x$ per year.

It is therefore an advantage of some, but not necessarily all, embodiments of the present invention to provide a method for trading residential emissions.

It is another advantage of embodiments of the present invention to provide a residential emissions trading commodity.

It is another advantage of embodiments of the present invention to identify energy savings opportunities in residential properties.

It is yet another advantage of embodiments of the present invention to provide a method for converting an aggregate of residential emissions reductions into a tradable commodity that can be marketed.

Additional advantages of the invention are set forth, in part, in the description that follows and, in part, will be apparent to one of ordinary skill in the art from the description and/or from the practice of the invention.

SUMMARY OF THE INVENTION

In response to the foregoing challenges, Applicants have developed an innovative method for trading residential emissions credits, comprising the steps of: identifying an energy savings opportunity in a residential property; quantifying an emissions reduction produced by the energy savings opportunity; and aggregating the emissions reductions into a tradable commodity.

The step of aggregating the emissions reductions into a tradable commodity may further comprise the step of converting the emissions reductions into at least one tradable credit.

The step of quantifying an emissions reduction produced by the energy savings opportunity may further comprise the steps of: measuring an energy savings resulting from the energy savings opportunity; and calculating an emissions reduction resulting from the energy savings. The step of measuring an energy savings resulting from the energy savings opportunity may be selected from the group consisting of conducting one or more of: on-site inspection; metering; sub-metering; utility bill analysis; and engineering modeling.

The step of conducting on-site inspection may be selected from the group consisting of conducting one or more of: report review; visual inspection; and device rating verification. The step of conducting utility bill analysis may further comprise conducting one or more of the steps of: analyzing samples of measured data of the energy savings from the residential property; analyzing at least one sample of control data of residential energy use; analyzing raw data; analyzing data normalized by weather; analyzing stratified data; and analyzing data that are both stratified and weather-normalized.

The step of conducting engineering modeling may further comprise the step of utilizing building energy software. The engineering modeling may be selected from the group consisting of conducting one or more of: degree day analysis; bin analysis; hourly analysis; and time-step analysis.

The step of calculating the emissions reduction may further comprise the step of qualifying a technical confidence factor for the energy savings opportunity.

The step of aggregating the emissions reductions into a tradable commodity may further comprise the steps of: identifying a tradable portion of the emissions reductions; assigning a technical confidence factor to the emissions reductions to quantify the tradable portion of the emissions reductions; converting the emissions reductions; and monetizing the emissions reductions. Alternatively, the step of aggregating the emissions reductions into a tradable commodity may further comprise the steps of: identifying a tradable portion of the emissions reductions; assigning a technical confidence factor to the emissions reductions to quantify the tradable portion of the emissions reductions; and converting the emissions reductions into a non-monetary consideration.

The method for trading residential emissions reductions may further comprise the steps of: verifying the quantification of the emissions reduction; and monitoring the identification of the residential energy savings opportunity and the quantification of the emissions reduction. Alternatively, the method may further comprise the step of verifying the quantification of the emissions reduction, or the method may further comprise the step of monitoring the identification of the residential energy savings opportunity and the quantification of the emissions reduction.

The step of verifying the quantification of the emissions reduction may further comprise the step of calculating a measured emissions reduction. The step of calculating the measured emissions reduction may further comprise the steps of: estimating a measured baseline energy use for the energy savings opportunity; estimating a measured baseline emissions factor for the energy savings opportunity; calculating a measured baseline emission by multiplying the measured baseline energy use with the measured baseline emissions factor; estimating a measured program energy use for the energy savings opportunity; estimating a measured program emissions factor for the energy savings opportunity; calculating a measured program emission by multiplying the measured program energy use with the measured program emissions factor; and calculating a measured emissions reduction by subtracting the measured program emission from the measured baseline emission.

The method may also further comprise the step of comparing the measured emissions reduction to a forecasted emissions reduction to verify that the emissions reduction predicted in the forecasting phase is achieved. The step of comparing the measured emissions reduction to the forecasted emissions reduction may further comprise the step of calculating the forecasted emissions reduction, wherein the step of calculating the forecasted emissions reduction comprises the steps of: estimating a forecasted baseline energy use for the energy savings opportunity; estimating a forecasted baseline emissions factor for the energy savings opportunity; calculating a forecasted baseline emission by multiplying the forecasted baseline energy use with the forecasted baseline emissions factor; estimating a forecasted program energy use for the energy savings opportunity; estimating a forecasted program emissions factor for the energy savings opportunity; calculating a forecasted program emission by multiplying the forecasted program energy use with the forecasted program emissions; and calculating a forecasted emissions reduction by subtracting the forecasted program emission from the forecasted baseline emission.

The step of monitoring the identification of the residential energy savings opportunity and the quantification of the emissions reduction may further comprise the steps of: compiling the quantified emissions reductions; and assessing the emissions reductions potential for a plurality of the energy savings opportunities.

According to another embodiment of the present invention, the method for providing a residential emissions trading program comprises the steps of: identifying an energy savings opportunity in a residential property; quantifying an emissions reduction produced by the energy savings opportunity; and aggregating a plurality of the emissions reductions from a plurality of the residential properties into a tradable commodity. The step of aggregating a plurality of the emissions reductions may further comprise the step of converting the plurality of emissions reductions into at least one tradable credit. The method may further comprise the step of marketing the tradable commodity.

According to this embodiment of the present invention, the step of aggregating a plurality of the emissions reductions may further comprise the step of bundling the emissions reductions. The emissions reductions may be bundled into an emissions pool. The step of marketing the tradable commodity may further comprise the step of conducting closed sales of a plurality of the tradable commodities. The step of marketing the tradable commodity may also further comprise the step of reserving a portion of the emissions reductions.

In another embodiment of the present invention, the method for providing a residential emissions trading program comprises the steps of: identifying an energy savings opportunity in a residential property; quantifying an emissions reduction produced by the energy savings opportunity; verifying the quantification of the emissions reduction; monitoring the identification of the residential energy savings opportunities and the quantification of the emissions reduction; aggregating a plurality of the emissions reductions from a plurality of the residential properties into a tradable commodity; and marketing the tradable commodity.

Applicants have also developed an innovative residential emissions trading commodity, comprising: an aggregation of emissions reductions produced by at least one energy savings opportunity in at least one residential property. The aggregation of emissions reductions may further comprise at least one tradable credit, or an emissions pool. Also, the aggregation of emissions reductions may further comprise a function of energy use and an emissions factor for the at least one energy savings opportunity.

According to another embodiment, the residential emissions trading commodity comprises: a verified aggregation of emissions reductions produced by at least one energy savings opportunity in at least one residential property.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of those embodiments of the present invention.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

Figure 1:
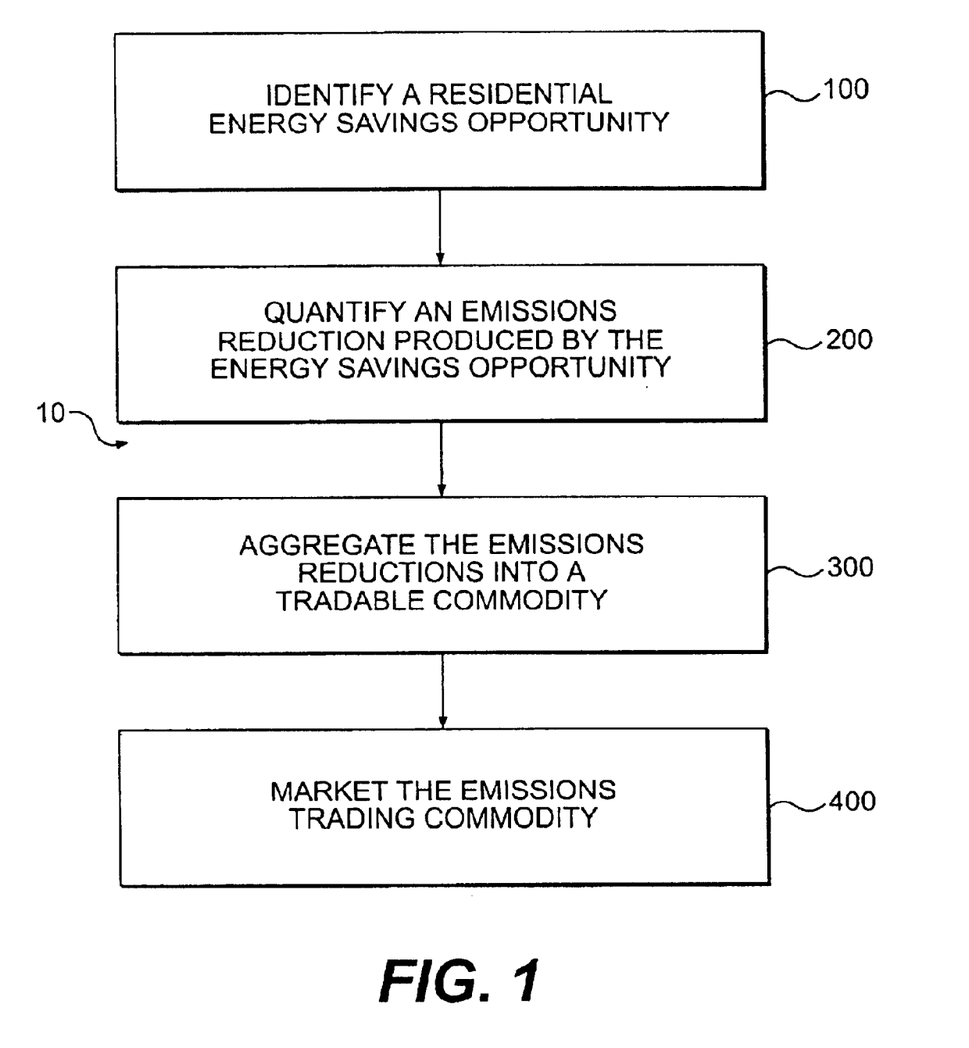
FIG. 1 is a flow chart depicting a method of identifying, quantifying, aggregating, and marketing reductions in residential emissions according to an embodiment of the present invention.

Reference will now be made to the method of the present invention, an example of which is shown in FIG. 1.

FIG. 1 is a flow chart depicting an embodiment of the method for identifying, quantifying, and aggregating reductions in residential emissions. As embodied herein, the method 10 comprises the steps of identifying a residential energy savings opportunity 100, quantifying an emissions reduction produced by the energy savings opportunity 200, and aggregating the emissions reductions into a tradable commodity 300, such as, but not limited to, emissions reductions or emissions trading credit(s). The method may further comprise the step of marketing the emissions trading commodity 400.

Identification of Energy Savings Opportunities

Step 100, identifying a residential energy savings opportunity, may comprise any one or more of a variety of energy efficient improvements. Such improvements may include, but are not limited to: replacing older appliances with more energy efficient appliances; upgrading domestic hot water (DHW) heating systems; upgrading heating, ventilation, and/or air conditioning (HVAC) systems; modifying lighting; fuel switching; and renovating the entire home. Purchase of new homes with more energy efficient systems or upgrades from existing systems to more energy efficient ones are both contemplated by the present invention.

The replacement of less efficient appliances is a simple method by which to increase average household energy efficiency. Newer and more energy efficient appliances may consume less energy without sacrificing performance. Energy efficient products may also provide energy-saving benefits by working faster, thereby using energy for less time. Appliance upgrades may include, but are not limited to: refrigerators; stoves and ovens; clothes washers and dryers; and dishwashers.

DHW systems consume energy by heating water for showers, baths, and other household uses. Improvements in the DHW system of homes may result in substantial energy savings. For example, an oil-fired boiler may be replaced with a natural gas hot water heater.

Residential HVAC systems maintain comfortable temperatures in buildings. The demands placed on a particular HVAC system may be highly dependent not only on the weather, but also on how well the home is insulated and the demands of the occupants. In geographic regions where the exterior environment is uncomfortable for much of the year (whether for heating or cooling), improvements in the HVAC system have the potential for substantial energy savings.

Adequate lighting is typically preferable in living and working environments. Many spaces, such as hallways, may require twenty-four hour illumination. Lighting upgrades therefore have substantial potential to reduce energy consumption, especially in situations where lights are on for extended periods of time. Improvements in lighting efficiencies may also lead to reduced cooling loads because inefficient lights cause electrical energy to be converted to heat instead of light.

Fuel switching may include changing from a more-polluting to a less-polluting fuel. Most combustible fuels, while producing energy, result in a range of air pollutants. Although increasing the efficiency of the device or system involved can reduce this pollution to some degree, changing to a "cleaner" fuel may be advantageous to reduce emissions. Fuel switching improvements may include, but are not limited to, maintaining use of a specific fuel (e.g., switching from coal with a high sulfur content to coal with a low sulfur content) or switching to a different fuel type (e.g., switching from fuel oil to natural gas). Other cleaner fuel sources may include, but are not limited to, solar, heat pump, geothermal, and methane. Fuel switching changes the emission factors for the device and may also result in a greater operating efficiency, because maintenance may be done on the device while doing the fuel conversion.

Whole home upgrades may increase home insulation and decrease both infiltration of outside air (cold air in winter and hot air in summer) and leakage of inside air (warm air in winter and cool air in summer). Such renovations may include, but are not limited to: installing insulation in attics and exterior walls; installing more efficient windows; and reducing infiltration. Whole home energy consumption is heavily dependent on the exterior environment and it may be, therefore, advantageous to normalize the result using a weather index for the local environment, when possible.

Other energy efficient upgrades or improvements are considered to be within the scope of the present invention.

Quantification

Figure 2:
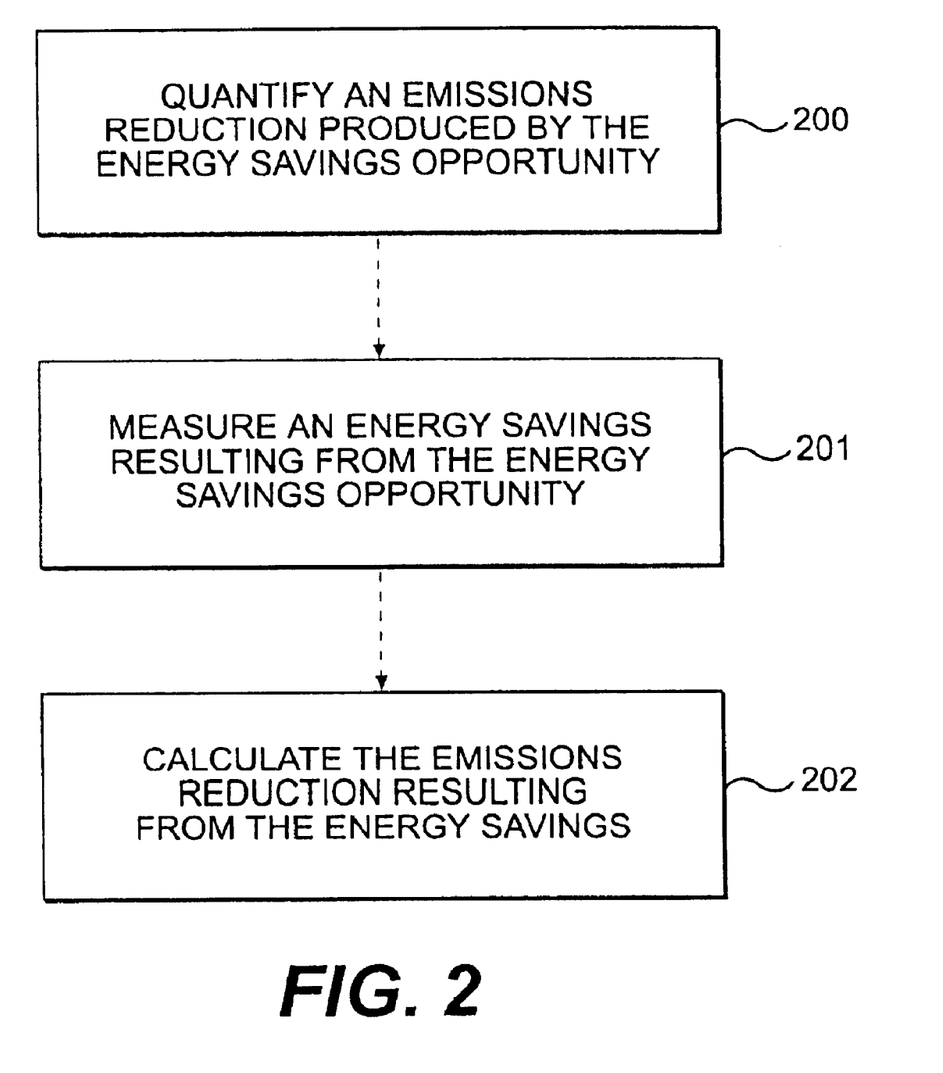
FIG. 2 is a flow chart depicting a method of measuring an energy savings and calculating the emissions reductions resulting from the energy savings according to an embodiment of the present invention.
Figure 4:
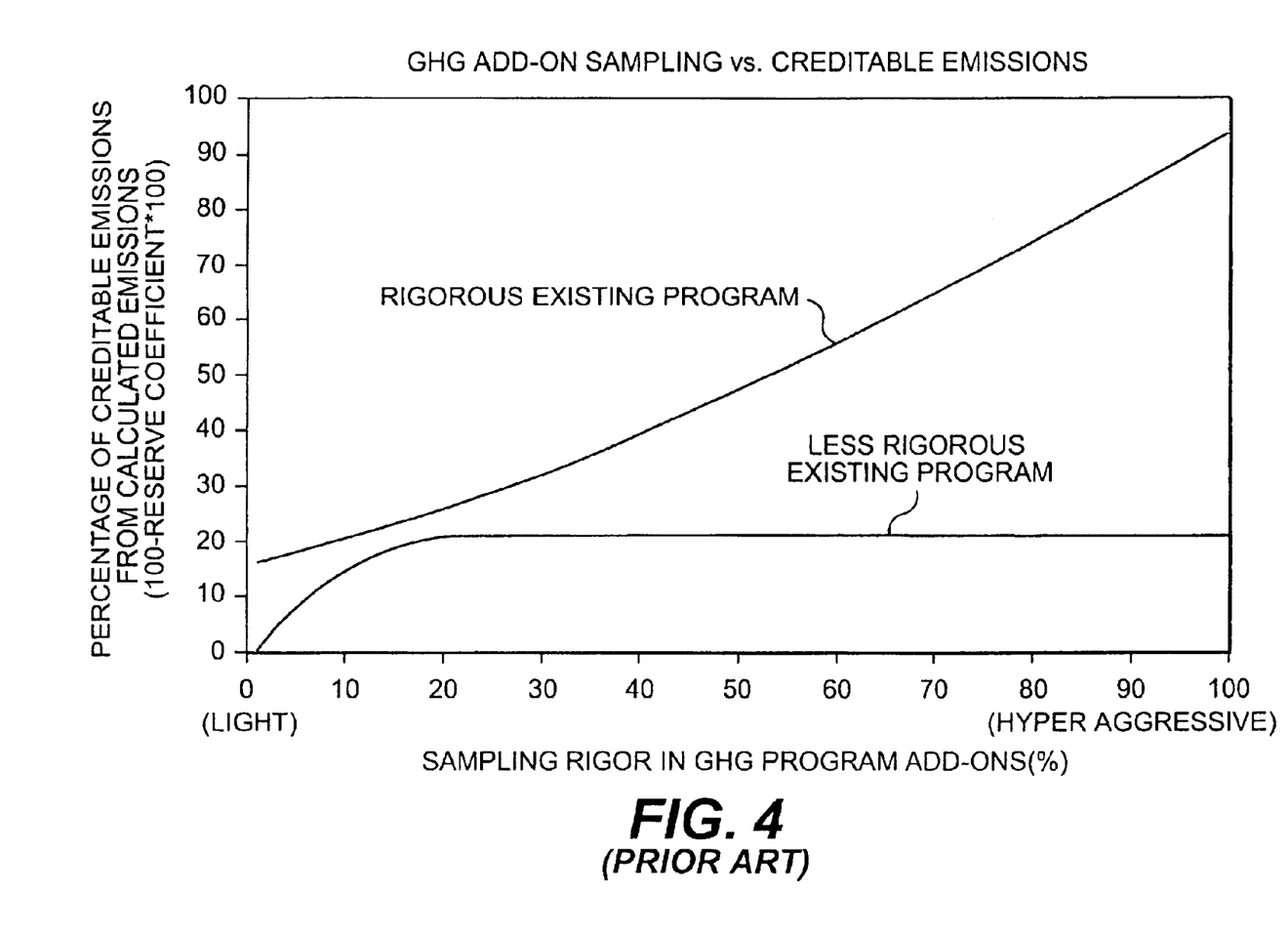
FIG. 4 is a graph depicting GHG add-on sampling versus creditable emissions according to prior art monitoring and verification programs.

The step of quantifying the emissions reduction produced by an energy savings opportunity 200 may further comprise the steps of measuring the energy savings resulting from the energy savings opportunity 201 and calculating the emissions reduction resulting from the energy savings 202, as shown in FIG. 2. Emissions reductions may be calculated on a per house basis. In an embodiment of the present invention, this quantification process is a step by step approach for the measurement, monitoring, and verification (M&V) of energy efficiency programs. An embodiment may be designed to address the needs of the different participants of an emissions trading initiative (ETI). It is anticipated as demand for tradable emissions increases in the marketplace (and the value of tradable emissions increases), that a more rigid (or less flexible) approach to M&V may be warranted. As shown in FIG. 4, the sampling rigor in existing programs has a direct correlation to the amount of creditable emissions that are generated (in this example, for a GHG program).

Figure 3:
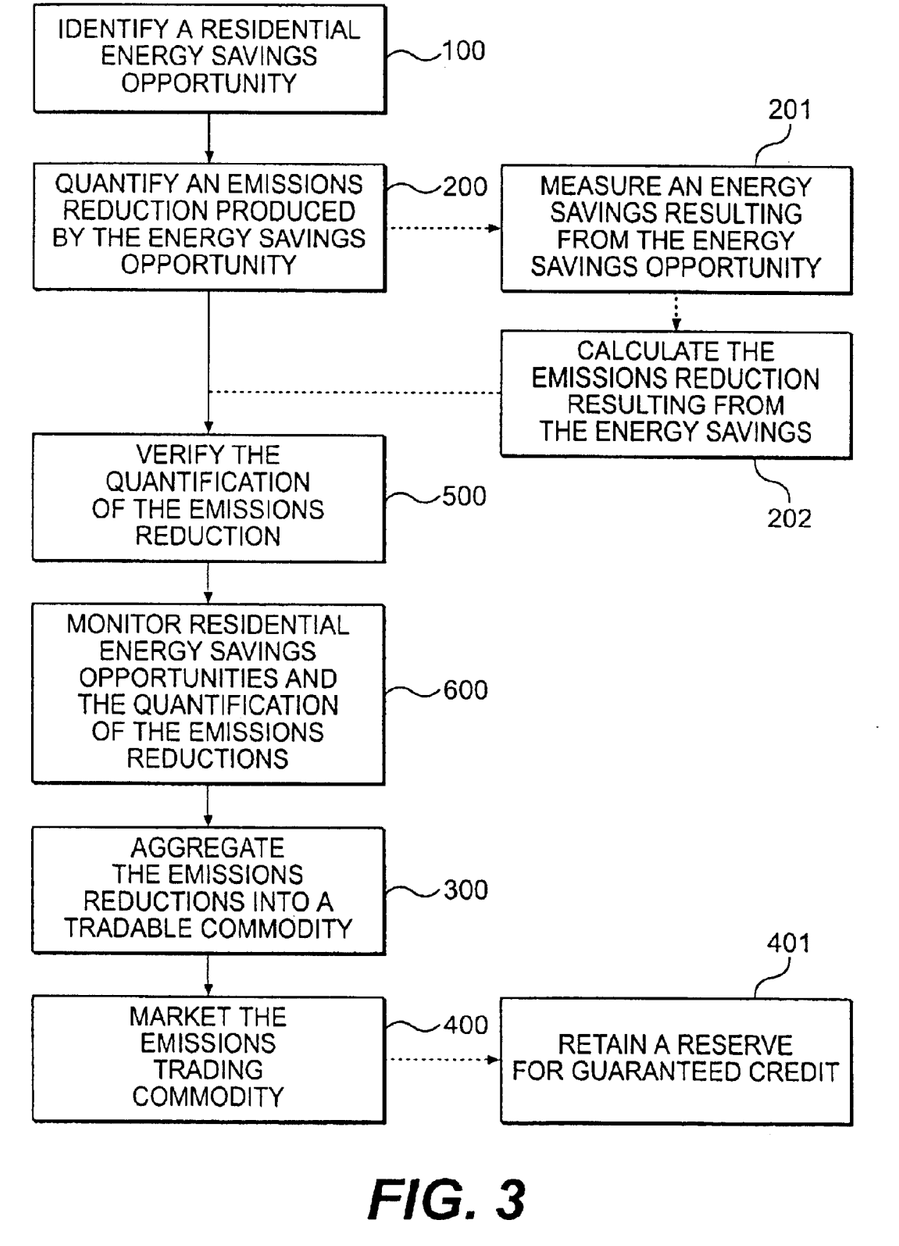
FIG. 3 is a flow chart depicting a method of identifying, quantifying, measuring, calculating, verifying, monitoring, aggregating, marketing, and reserving reductions in residential emissions according to another embodiment of the present invention.

An embodiment of the present invention may further provide credible monitoring 600 and verification 500 procedures for various potential energy efficiency programs, as shown in FIG. 3, in order to:

Define a common M&V language to be used by participants in an ETI;

Define a range of acceptable methods for quantifying energy savings and emissions reductions;

Define acceptable methodology for deriving emissions reductions from energy savings;

Give guidance to programs that are starting to develop their own protocols;

Evaluate the technical rigor of existing M&V techniques for energy savings and emissions reductions and determine technical confidence factors for calculating tradable emissions reductions; and Explain the relationship between technical rigor and economic feasibility of existing and planned M&V protocols.

Embodiments of the present invention may comprise an M&V protocol for participants in an ETI, including but not limited to: ETI partners; ETI administration staff; third party auditors; and ETI investors.

In an embodiment of the present invention, the M&V protocol may focus on the specification of measurement protocols that are to be implemented by partners in an ETI. It may also include monitoring protocols that may be implemented by ETI administration staff, and verification protocols that may be implemented by third party auditors. A purpose of the monitoring protocol may be to compile and manage data collected by ETI partners. The verification protocol may act as a quality assurance mechanism on data submitted by utilities (for the benefit of ETI investors).

Additional, fewer, or different participants in an ETI are considered well within the scope of the present invention.

A responsibility of ETI partners may be to carry out measurement of emissions reductions from qualifying energy efficiency programs or improvements. A responsibility of ETI administration staff may be data collection and management. A responsibility of third party auditors may be quality assurance and quality control (on data supplied by partners) for investors. A responsibility of ETI investors may be to provide a source of funding for an ETI.

As embodied herein, M&V may be modified for several types of projects aimed at improving energy efficiency in residential buildings. Embodiments of the present invention may comprise a sequence of steps that are typically followed in establishing estimated savings and verifying the actual savings from any given energy efficiency project:

1. Estimation (measuring) and verification of energy savings;
2. Quantifying emissions reductions;
3. Assignment of tradable emissions reductions; and
4. Provisions for entering into credit markets.

Estimation and Verification of Energy Savings

An initial estimate of the energy savings to be achieved from the implementation of a particular energy efficiency measure or project may be calculated based on an assessment of the difference between:

The baseline energy use; and

The post-implementation or measured energy use.

Baseline forecasts may be constructed from historical records of energy consumption and use. When historical information is not available, or alternatively, field monitoring may be utilized. Post-implementation energy use may be measured or may be estimated through engineering calculations or deemed savings estimates. Deemed savings estimates may be used for energy efficient technologies that are well-understood (e.g., many electric appliances). For these technologies, there is general agreement in the field of art on the energy use and savings that can be achieved. After installation of the measures, the baseline energy use and post-implementation energy use may be verified through field monitoring or deemed savings estimates. Net energy savings may be calculated by subtracting the post-implementation energy consumption from the baseline energy consumption. In cases where the energy consumption is highly dependent on external variables (such as an HVAC system's dependence on weather), the energy consumption may be normalized for such variables.

Verifying Emissions Reductions

The method of the present invention may further comprise a step to verify the quantification of the emissions reduction 500. Baseline emissions and emissions reductions that result from the implementation of a project may be calculated from energy consumption and savings data. The translation from energy use/savings to emissions/reductions may be based on emissions factors appropriate to the device and fuel source (i.e., gas, oil, electric) being examined. In accordance with an embodiment of the present invention, a methodology may be used to determine emissions factors based on EPA's "Compilation of Air Pollutant Emission Factors" (frequently referred to as "AP-42"), which is incorporated herein by reference. Once the energy consumption has been calculated for the baseline and upgrade scenarios, the emissions factor database may be used to calculate emissions reductions of the program.

Calculating Emissions Reductions

An ETI of the present invention is intended to create a marketplace for the trading of residential emissions reductions that result from energy efficiency programs. Energy efficiency programs may reduce household energy consumption through the implementation of more efficient technologies or the maintenance of existing devices within the home.

To calculate emissions reductions from an energy efficiency program, the baseline energy use and resulting emissions may be calculated. Baseline emissions are those emissions that would have occurred if the energy efficiency program had not been undertaken, or if the status quo had not been altered by the energy efficiency program. This baseline may not be constant over time because changes in occupant behavior, and/or weather may affect baseline energy use and emissions.

Once the baseline emissions have been calculated, program emissions may be calculated. Program emissions are those emissions that occur after the energy efficiency program has been installed or completed. Program emissions may also change in time due to the effects of occupant behavior or weather.

Figure 5:
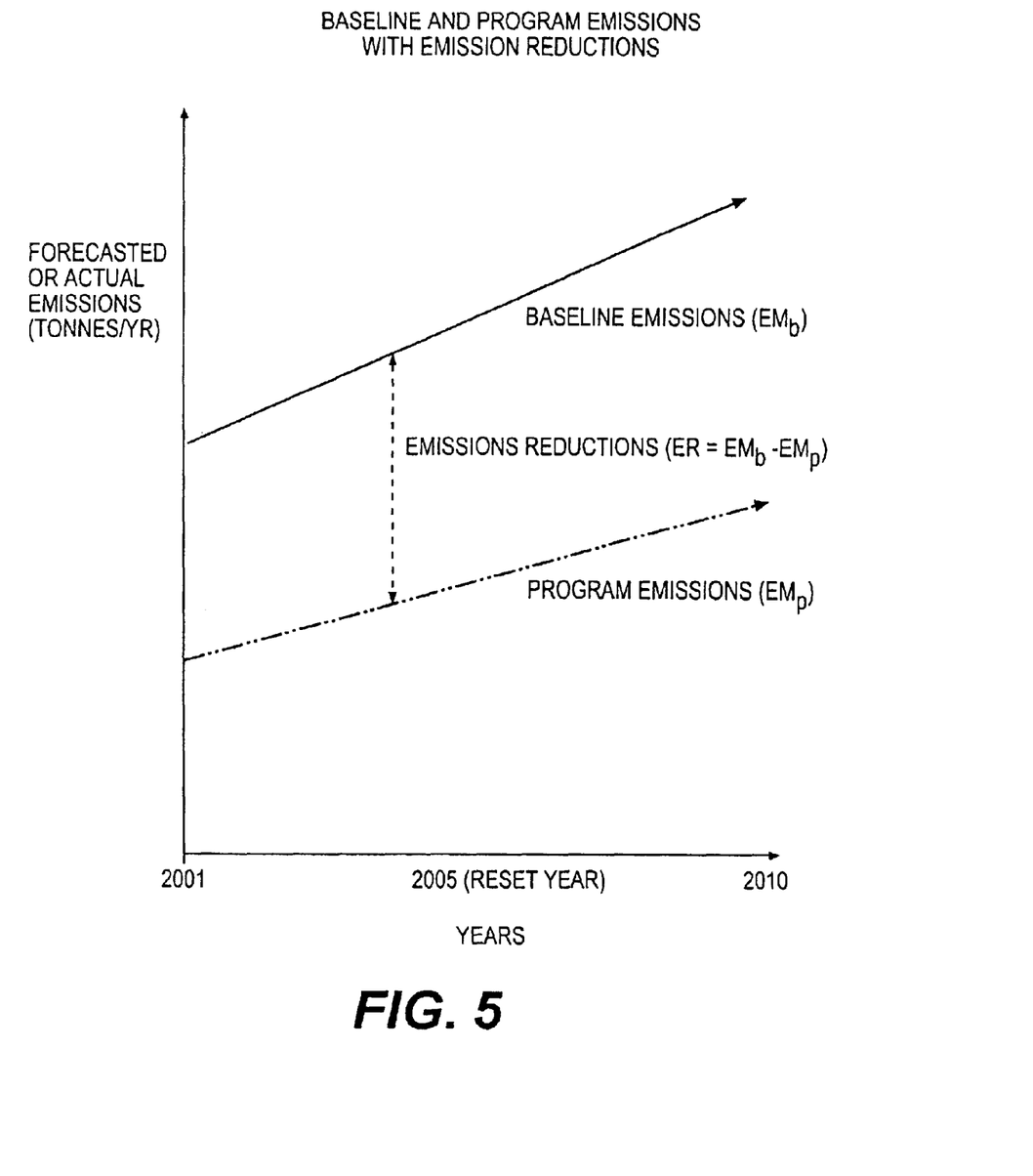
FIG. 5 is a graph depicting baseline and program emissions with emission reductions according to an embodiment of the present invention.

After the baseline emissions and the program emissions have been calculated, the emissions reductions may be calculated as the difference between the baseline and the program emissions. The emissions reduction, shown in FIG. 5, is the amount of emissions that are avoided due to the energy efficiency program.

Assigning Tradable Emissions Reductions

As embodied herein, there are several general approaches that can be used to measure energy savings and the resulting emissions reductions. Depending on the measurement method used, the reliability of the resulting emissions reduction assessment will vary. For example, the impacts of some energy efficiency programs are evaluated using random on-site inspections, while other energy efficiency programs are evaluated using detailed sub-metering. The sub-metering approach to M&V provides a much more reliable assessment of the energy savings (and resulting emissions reductions) than the random inspection approach.

For an ETI of the present invention, it may be advantageous to develop a reliable assessment of the emissions reductions that are to be traded. Rather than mandating a specific rigorous M&V protocol that ensures a fixed quantity of emissions reductions, an embodiment of the M&V protocol of the present invention allows for the use of one of several optional approaches to M&V. Each of these optional M&V approaches may be assigned a "technical confidence factor" (TCF). This factor effectively discounts the emissions reduction quantified, based on the level of rigor of the M&V approach used. Thus, not all of the calculated emissions reductions may be offered for sale or trade in step 400, due to the uncertainty inherent in the calculation of both energy savings and emissions reductions. A certain amount of the calculated emissions reductions may be kept in reserve, step 401, while the rest is offered for sale or trade.

M&V Phases

The method of the present invention may further comprise step 600, monitoring the residential energy savings opportunities and the quantification of the emissions reductions. In the early stages of a program, it may be desired to predict emissions reductions years into the future. This may necessitate a number of assumptions about energy consumption and emissions factors. This forecasting phase is outlined in FIG. 6.

Figure 7:
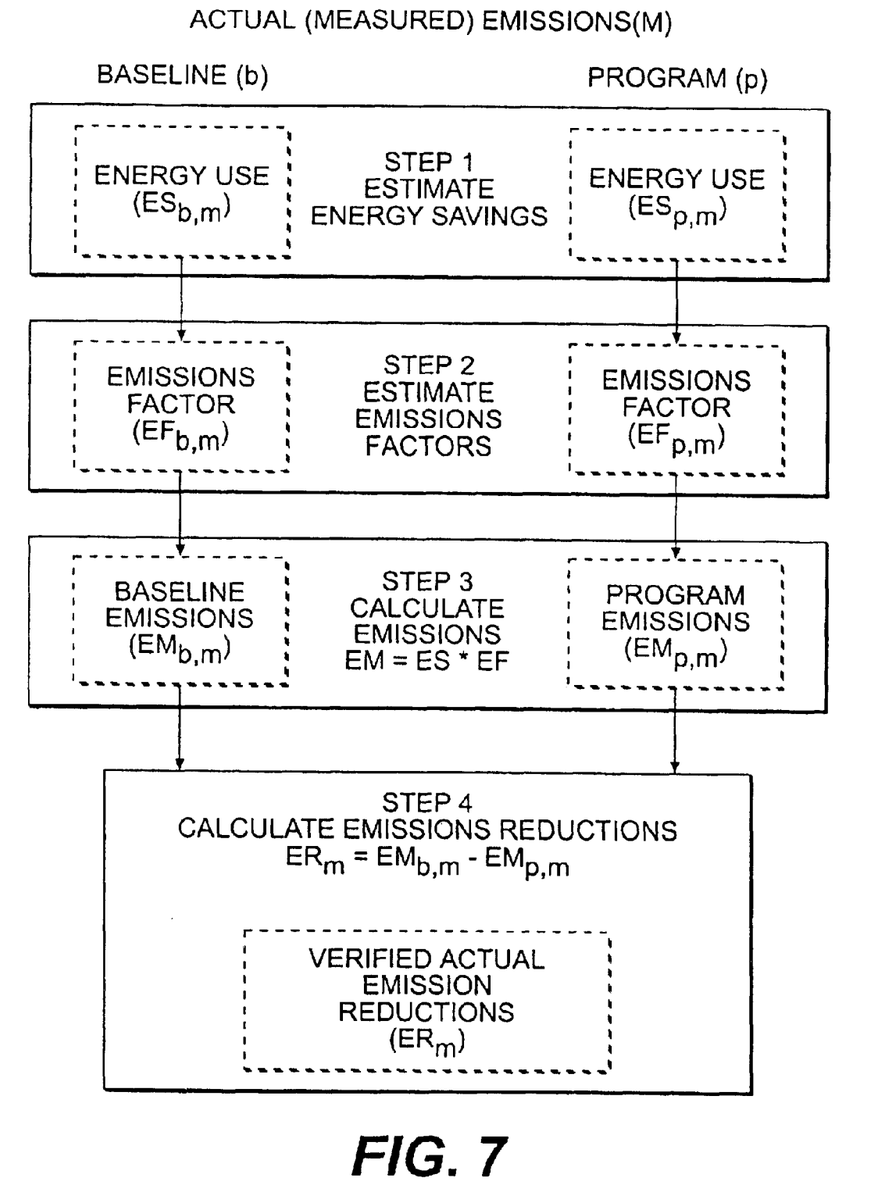
FIG. 7 is a flow chart depicting measured baseline and program emissions according to an embodiment of the present invention.

Once the program has been implemented, actual energy consumption and emissions factors may be measured, thereby allowing estimates of the actual emissions reductions. This measurement phase 201 is shown in FIG. 7.

The calculations and estimates undertaken in the measurement phase may be used to verify that the emissions reductions predicted in the forecasting phase are achieved. This verification process 500 gives the emissions reduction purchaser confirmation that the reductions are genuine. Consequently, this process may ensure that the emissions reductions garner a reasonable price in any marketplace.

Energy savings may be initially calculated from analysis of historical energy consumption and modeling of future consumption. These calculations will have a degree of uncertainty and may be verified after the program has been in place for a length of time, thereby allowing actual consumption to be measured, such as from utility bills or metering devices.

For each energy savings opportunity or energy efficiency program, the energy consumption with the energy efficiency program may be subtracted from the energy consumption without the energy efficiency program, giving the energy savings from the program. Energy consumption may be calculated from a number of measurable variables and their associated measurement techniques.

As embodied herein, the present invention contemplates quantifying the following aspects of a given energy efficiency (or emissions reduction) project:

1. The annual energy use in the baseline home (without upgrades) for each year in the life of the program;
2. The annual energy use in the upgraded home (with installed energy efficiency measures) for each year in the life of the program;
3. The appropriate emissions factors for the energy consumed for each year in the life of the program;
4. The total emissions reductions from the program; and
5. The tradable portion of these emissions reductions.

For each type of energy efficiency program, specific data types and analytical procedures may be identified. ETI partners may be responsible for data collection (i.e., measurement) for their energy efficiency programs. Using data provided by the partners and an M&V procedure, the data may be compiled and used to assess the emissions reductions potential for each energy efficiency program participating in an ETI.

Figure 6:
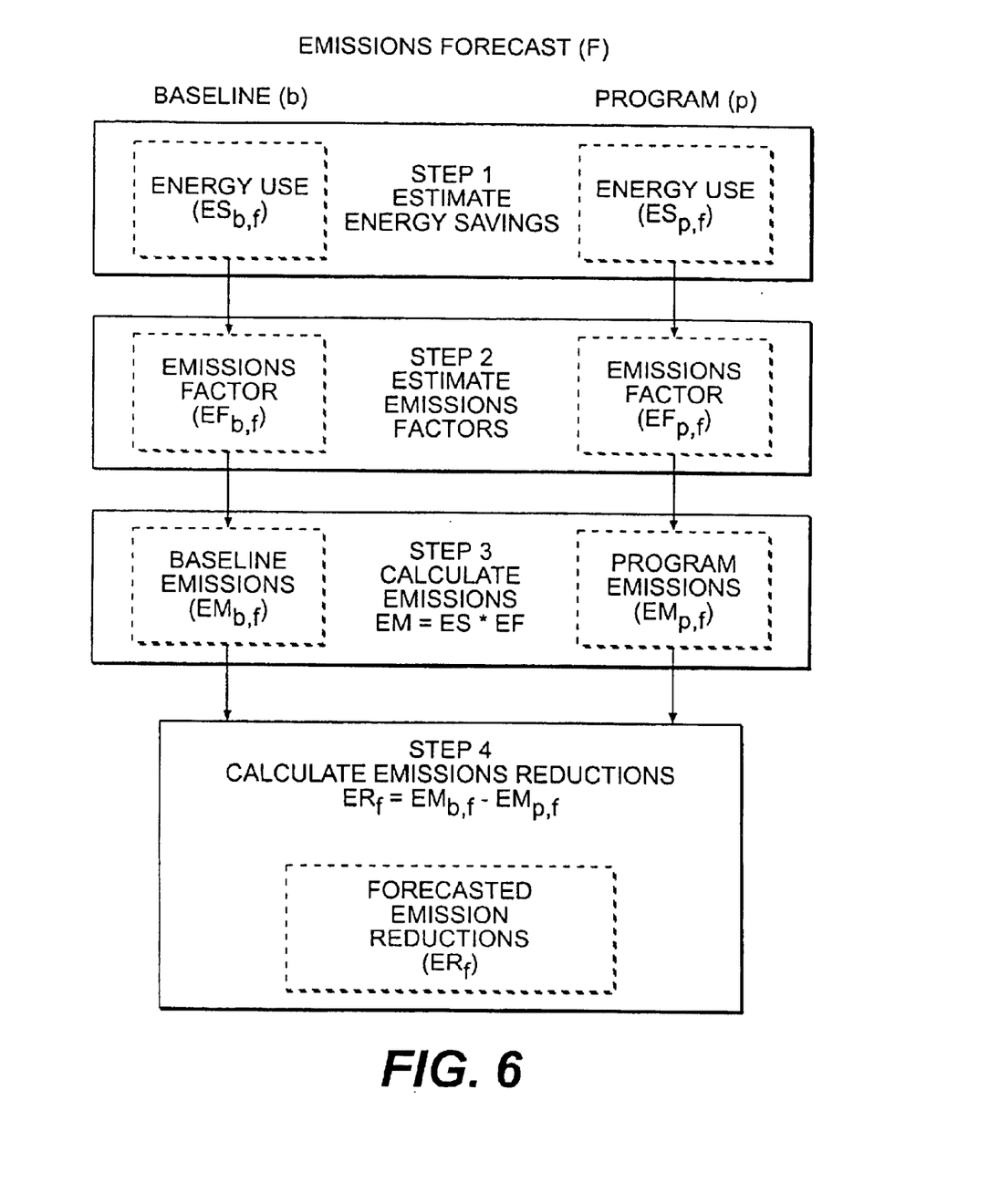
FIG. 6 is a flow chart depicting forecasted baseline and program emissions according to an embodiment of the present invention.

In the step of calculating the emissions reduction 202 for a particular energy efficiency program, project or opportunity, first a forecasted baseline energy use and a forecasted baseline emissions factor for the energy savings opportunity may be estimated. A forecasted baseline emission may be calculated by multiplying the forecasted baseline energy use with the forecasted baseline emissions factor. After the baseline calculation, a forecasted program energy use and a forecasted program emissions factor for the energy savings opportunity may be estimated. A forecasted program emission is calculated by multiplying the forecasted program energy use with the forecasted program emissions factor. Finally, a forecasted emissions reduction for a particular energy efficiency program, project or opportunity may be calculated by subtracting the forecasted program emission from the forecasted baseline emission.

In the step of verifying the quantification of the emissions reduction 500 for a particular energy efficiency program, project, or opportunity, a measured baseline energy use and a measured baseline emissions factor for the energy savings opportunity may be estimated. A measured baseline emission may be calculated by multiplying the measured baseline energy use with the measured baseline emissions factor. Then, a measured program energy use and a measured program emissions factor for the energy savings opportunity may be estimated. A measured program emission may then be calculated by multiplying the measured program energy use with the measured program emissions factor. A measured emissions reduction is calculated by subtracting the measured program emission from the measured baseline emission. To complete the verification step, the forecasted emissions reduction may be compared with the measured emissions reduction. This comparison permits the quantification of a TCF for the particular energy efficiency program, project, or energy savings opportunity.

In the step of aggregating the emissions reductions into a tradable commodity 300, the estimated emissions from all of the programs offered by the partners may be combined into a single emissions pool. Only a portion of this aggregate pool may be offered for trade. Third party auditors may also periodically review the utility data collection procedures (i.e., perform verification).

A variety of aggregation methods may be used in embodiments of the present invention. For example, the aggregation may be a simple pooling mechanism with no guarantee; a guaranteed pooling mechanism; an investment fund; or any other appropriate aggregation technique.

The level of assumed risk and the level of buyer acceptance in the market differ in the pooling options. In an embodiment with a guaranteed pooling mechanism, to the extent that third parties assume a portion of the risk, this would tend to support the value of the credits. Thus, the more risk that is assumed, the more improved may be the product's market acceptance and the better the market perception of the initiative.

Another distinction between the pooling options is the level of due diligence required to complete the transaction. If the program administrator stands behind its technical specifications, and guarantees delivery of reductions according to those specifications, the buyer's due diligence may be limited to accepting the M&V protocols for the pool. If the program administrator does not guarantee delivery, every component of every offering may need to be fully disclosed, and the M&V protocols potentially may have to be re-negotiated for every offering. Under a guaranteed pool option, the commodity may have a much better chance of becoming a uniform product offering.

Further, greater discretion may be available through a guaranteed pool or an investment fund. The supply risk, performance risk, regulatory risk, and market acceptance may be smoothed out through these two instruments but typically not in the simple pooling mechanism.

Another distinction between the aggregation methods is the speed at which these options can be executed. An unsecured pool may be delivered quickly. An investment fund may take longer to structure.

In the step of aggregating the emissions reductions into a tradable commodity 300, the tradable portion of the emissions pool may be determined, based on the measurement methods used by each partner. Instead of mandating a specific measurement protocol, a TCF may be assigned to each measurement method to be used by each partner. A purpose of TCFs is to quantify the portion of the "measured" emissions reductions that are "tradable." For example, consider two utility programs that promote the installation of high efficiency air-conditioners. Each generates 1,000 tons of GHG emissions reductions. One utility chooses to use an engineering calculation approach to the evaluation of its programs (with a TCF of 0.6), thus yielding 600 tons of tradable emissions. The other utility chooses to use a sub-metering approach to the evaluation of its programs (with a TCF of 0.8), yielding 800 tons of tradable emissions.

The step of aggregating the emissions reductions into a tradable commodity 300 may further comprise monetizing the emissions reductions, or converting the emissions reductions to another form of consideration. The tradable commodity may comprise emissions reductions, credit(s), or any other suitable commodity. In the step of marketing the emissions commodity 400, the "rights" to the emissions commodity resulting from the energy savings may be exchanged for a pro-rata share of the net revenues from the sale of the emissions commodity. The emissions commodity may be sold by an emissions credit broker to domestic and international emissions markets. The net proceeds may be distributed to the utility participants. As contemplated by the present invention, the emissions commodity may also be transferred in closed sales.

As an example of an embodiment of the present invention, a municipal utility becomes a partner in an ETI. The municipal utility provides builders with a $500 rebate in the utility hook-up fee per energy efficient home. Over the course of a year, the utility provides rebates to 1,000 homes, resulting in a reduction of 3 million tons of GHG each year for the next 10 years. The utility assigns the emissions credits, and the credits are aggregated with additional credits and are brought to market as a pool. After administrative costs are deducted, a prorated share of the proceeds is returned to the utility. The utility in turn may reinvest the funds in future demand side management programs. This example of an embodiment of the present invention is exemplary and illustrative only and is not intended to limit the invention as claimed to any particular embodiment or combination of embodiments.

The present invention is also directed to a residential emissions trading commodity. The commodity may be defined by the method steps described above. The trading commodity may comprise an aggregation of emissions reductions produced by one or more energy savings opportunities in one or more residential properties. Alternatively, verification processes described above may be employed to create a commodity that is a verified aggregation of emissions reductions.

It will be apparent to those skilled in the art that various modifications and variations can be made in the construction, configuration, steps, and/or operation of the present invention without departing from the scope or spirit of the invention. The steps of the method may be performed in an order other than that described. Alternative M&V protocols could be used, provided the tradable commodities remained sufficiently reliable to be marketable.

On-site inspection, metering, sub-metering, or utility bill analysis or a combination thereof may be used to assess the energy savings. On-site inspection may include report review, visual inspection, and device rating verification. Utility bill analysis may comprise analyzing: samples of measured data of the energy savings from the residential properties; samples of control data of residential energy use; raw data; data normalized by weather; stratified data; data that are both stratified and weather-normalized; or any combination thereof.

Additional measuring methodologies may include engineering modeling or engineering calculations to assess the energy savings. Engineering modeling may be performed on a computer using building energy software. Engineering modeling may use degree day analysis, such as heating degree day analysis, bin analysis, hourly analysis, time-step analysis, or any other appropriate modeling means.

The present invention contemplates participation in existing new source review, open market, and area source emissions trading markets where other pollutants such as $NO_x$, VOC, $SO_x$, PM, and CO and $CO_2$ emissions reductions are traded. Further, a four pollutants—$NO_2$, $SO_x$, $CO_2$ and mercury—approach to emissions regulation is currently under consideration in legislative arenas. It is expressly contemplated that these—and other pollutants yet to be determined—are within the scope of the present invention.

In addition, some or all of the method steps may be implemented via data processing means in an embodiment of the present invention. In particular, a system for residential emissions trading may comprise client device(s) for inputting data relating to energy savings opportunities in residential properties. Client device(s) may comprise, but are not limited to, one or more computers or any other suitable hardware device. Client device(s) may communicate with one or more servers via a network, such as, but not limited to, the Internet. One or more databases may reside on server(s) for storing inputted data. Data stored on database(s) may be processed for quantifying and aggregating emissions reductions produced by the energy savings opportunities. Software contained on database(s) may comprise program instructions for carrying out the various calculations. Thus, it is intended that the present invention cover the modifications and variations of the invention, provided they come within the scope of the appended claims and their equivalents.

What is claimed is:

1. A computer-implemented method for providing a residential emissions trading program, comprising the steps of:
   identifying an energy savings opportunity in a residential property;
   quantifying an emissions reduction produced by the energy savings opportunity,
      wherein quantifying the emissions reduction further comprises measuring an energy savings resulting from the energy savings opportunity and calculating an emissions reduction resulting from the energy savings, and wherein calculating the emissions reduction further comprises qualifying a technical confidence factor for the energy savings opportunity; and
   aggregating the emissions reductions into a tradable commodity.

2. The computer-implemented method according to claim 1, wherein the step of aggregating the emissions reductions into a tradable commodity further comprises the step of converting the emissions reductions into at least one tradable credit.

3. The computer-implemented method according to claim 1, wherein the step of measuring an energy savings resulting from the energy savings opportunity is selected from the group consisting of conducting one or more of: on-site inspection; metering; sub-metering; utility bill analysis; and engineering modeling.

4. The computer-implemented method according to claim 3, wherein the step of conducting on-site inspection is selected from the group consisting of conducting one or more of: report review; visual inspection; and device rating verification.

5. The computer-implemented method according to claim 3, wherein the step of conducting utility bill analysis further comprises conducting one or more of the steps of:
   analyzing samples of measured data of the energy savings from the residential property;

analyzing at least one sample of control data of residential energy use;

analyzing raw data;

analyzing data normalized by weather;

analyzing stratified data; and analyzing data that are both stratified and weather-normalized.

6. The computer-implemented method according to claim 3, wherein the step of conducting engineering modeling further comprises the step of utilizing energy software.

7. The computer-implemented method according to claim 3, wherein the engineering modeling is selected from the group consisting of conducting one or more of: degree day analysis; bin analysis; hourly analysis; and time-step analysis.

8. A computer-implemented method for providing a residential emissions trading program, comprising the steps of:

identifying an energy savings opportunity in a residential property;

quantifying an emissions reduction produced by the energy savings opportunity; and aggregating the emissions reductions into a tradable commodity, wherein aggregating the emissions reductions further comprises identifying a tradable portion of the emissions reductions; assigning a technical confidence factor to the emissions reductions to quantify the tradable portion of the emissions reductions; converting the emissions reductions; and monetizing the emissions reductions.

9. The computer-implemented method according to claim 1, wherein the step of aggregating the emissions reductions into at least one tradable commodity further comprises the steps of:

identifying a tradable portion of the emissions reductions;

assigning a technical confidence factor to the emissions reductions to quantify the tradable portion of the emissions reductions; and converting the emissions reductions into a non-monetary consideration.

10. The computer-implemented method according to claim 1, further comprising the steps of:

verifying the quantification of the emissions reduction; and monitoring the identification of the residential energy savings opportunity and the quantification of the emissions reduction.

11. The computer-implemented method according to claim 1, further comprising the step of verifying the quantification of the emissions reduction.

12. The computer-implemented method according to claim 1, further comprising the step of monitoring the identification of the residential energy savings opportunity and the quantification of the emissions reduction.

13. The computer-implemented method according to claim 10, wherein the step of verifying the quantification of the emissions reduction further comprises the step of calculating a measured emissions reduction.

14. A computer-implemented method for providing a residential emissions trading program, comprising the steps of:

identifying an energy savings opportunity in a residential property;

quantifying an emissions reduction produced by the energy savings opportunity;

aggregating the emissions reductions into a tradable commodity;

verifying the quantification of the emissions reduction, wherein verifying the quantification of the emissions reduction comprises calculating a measured emissions reduction, and wherein calculating the measured emissions reduction further comprises:

estimating a measured baseline energy use for the energy savings opportunity;

estimating a measured baseline emissions factor for the energy savings opportunity;

calculating a measured baseline emission by multiplying the measured baseline energy use with the measured baseline emissions factor;

estimating a measured program energy use for the energy savings opportunity;

estimating a measured program emissions factor for the energy savings opportunity;

calculating a measured program emission by multiplying the measured program energy use with the measured program emissions factor; and calculating a measured emissions reduction by subtracting the measured program emission from the measured baseline emission; and monitoring the identification of the residential energy savings opportunity and the quantification of the emissions reduction.

15. The computer-implemented method according to claim 13, further comprising the step of comparing the measured emissions reduction to a forecasted emissions reduction to verify that the emissions reduction predicted in the forecasting phase is achieved.

16. A computer-implemented method for providing a residential emissions trading program, comprising the steps of:

identifying an energy savings opportunity in a residential property;

quantifying an emissions reduction produced by the energy savings opportunity;

aggregating the emissions reductions into a tradable commodity:

verifying the quantification of the emissions reduction, wherein verifying the quantification of the emissions reduction further comprises calculating a measured emissions reduction;

monitoring the identification of the residential energy savings opportunity and the quantification of the emissions reduction; and comparing the measured emissions reduction to a forecasted emissions reduction to verify that the emissions reduction predicted in the forecasting phase is achieved, wherein comparing the measured emissions reduction to the forecasted emissions reduction further comprises calculating the forecasted emissions reduction, and wherein calculating the forecasted emissions reduction comprises:

estimating a forecasted baseline energy use for the energy savings opportunity;

estimating a forecasted baseline emissions factor for the energy savings opportunity;

calculating a forecasted baseline emission by multiplying the forecasted baseline energy use with the forecasted baseline emissions factor;

estimating a forecasted program energy use for the energy savings opportunity;

estimating a forecasted program emissions factor for the energy savings opportunity;

calculating a forecasted program emission by multiplying the forecasted program energy use with the forecasted program emissions; and calculating a forecasted emissions reduction by subtracting the forecasted emission the forecasted baseline emission.

17. The computer-implemented method according to claim 10, wherein the step of monitoring the identification of the residential energy savings opportunity and the quantification of the emissions reduction further comprises the steps of:

compiling the quantified emissions reductions; and
assessing the emissions reductions potential for a plurality of the energy savings opportunities.

* * * * *